Feb. 11, 1958 E. D. MUNSON 2,822,633

LOOSE LEAF MEMORANDUM INDEX

Filed April 6, 1954 2 Sheets-Sheet 1

Inventor
EVERIS D. MUNSON

By [signature]
Attorney

Feb. 11, 1958 E. D. MUNSON 2,822,633

LOOSE LEAF MEMORANDUM INDEX

Filed April 6, 1954 2 Sheets-Sheet 2

Inventor
EVERIS D. MUNSON

By [signature]
Attorney 2,822,633

LOOSE LEAF MEMORANDUM INDEX

Everis D. Munson, St. Paul, Minn., assignor to Brown & Bigelow, St. Paul, Minn., a corporation of Minnesota Application April 6, 1954, Serial No. 421,320

8 Claims. (Cl. 40—104)

In using a telephone, it is often desirable to refer to an index for telephone numbers and names. It is desirable that the index be easily operated by one hand as well as providing an alphabetical index to guide the operator in selecting the name and telephone number of the party to be called. Where a series of alphabetically marked keys are employed with the index, the operator can easily select pages of the same by operating the key selected, and after referring to the same the memorandum index should be closed.

This invention relates to an improvement of the loose leaf memorandum index illustrated and described in Patent No. 2,536,544 dated January 2, 1951. In said patented index a pack of cards was provided which carried the letters of the alphabet and the sheets of which have spaces in which names and telephone numbers can be inserted. This loose leaf memorandum index was operated by a series of keys to open the index wherever the operator selected a page for reference. However, said patented index would remain open until the closure key which was positioned at the far right of the keyboard was operated so that the cover would close down over the loose leaves of the index.

The cover of the patented index could be closed by hand by engaging the same and moving it in a closing position.

In this invention an ordinary closing means is provided so that after the operator selects the page he wishes to refer to, he does not need to operate a closing key, but by the means herein provided the cover of the index will be automatically closed.

Furthermore, this invention includes features which cause the index to remain open for a period of time before the automatic closing means operates to close the cover of the index. This feature is desirable, because when the operator refers to the page he needs a certain period of time to select the information he desires from the page referred to after which it is not only convenient for the operator but desirable that the index close automatically without any physical operation or attention of the operator.

A simple inexpensive means has been provided herein where the loose leaf memorandum index is automatically closed after the operator has selected and opened the index to a predetermined page. This means of automatic closing the index after a space of time has elapsed from the opening period permits the operator to use the telephone with one hand and open the index with the other hand and immediately divert his attention away from the index leaving the hand of the operator free to make memorandums or for any purpose desired. This automatic closing means for the loose leaf memorandum index enables the operator to open the index and he can forget about closing it; yet be assured that the index will always be closed and ready for further reference when desired.

The automatic closing of this index is also important, because in the form of index set forth in Patent No.

2,536,544 when the index is opened all of the keys except the one just operated are locked against operation and none of the other keys can be operated until the cover of the index is closed. This also provides a neat attractive memorandum index which lies virtually flat when closed.

It is also an object to provide an adjustable timing means for regulating the time that the index will remain open. The timing means is of a very simple nature and includes a vacuum cup adapted to operate on a cup-like surface which tends to invert the free edges of the vacuum cup when contacting the same and also includes an adjustable bleeder plug which is compressed by a bleeder screw. When the bleeder screw has been properly set a locking nut holds the same in locked position. The bleeder plug with the bleeder screw provide means of permitting air to leak into the vacuum cup by passing over the threads of the screw, through the bleeder plug and through an opening in the center of the rivet which normally holds the vacuum cup in place.

Thus the timing means for holding the cover of the index open is of a very simple nature, inexpensive and easily adjusted to time the opening period of the index.

These features together with other details and objects of the invention will be clearly and fully defined.

In the drawings forming a part of the specification:

The drawings illustrate a portion of the loose leaf memorandum index A having a cover C which is adapted to normally close the index and wherein a series of index cards 12 are contained to form the index pack B.

The index A herein shown and described operates virtually identically to and is composed of the same parts, as that shown in Patent No. 2,536,544. This application carries the same identical numerals for the various operating parts. In this application only such parts which function with the automatic closing means herein described are shown. While a closure key is shown in said patent it will be apparent as hereinafter set forth that said closure key can be omitted when a loose leaf memorandum index A is made including the automatic closing means herein set forth. It is also apparent that the cover C may be closed by hand if the operator chooses to do so. The drawings in this application do not show the complete keyboard for operating the index, because such keyboard would be virtually identical to that shown in said patent.

Figure 4:
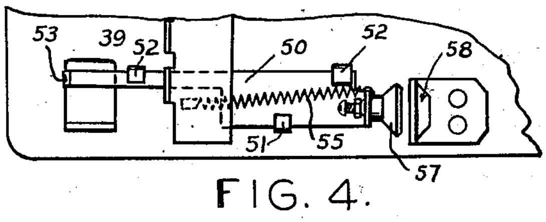
Figure 4 is a plan view of a detail of the index showing the location of the automatic closing means employed herein positioned on the bottom of the index.

The automatic closing means herein disclosed includes a slidable plate member 50 which rests on and slides on the bottom 39 of the index A. The plate 50, in its sliding movement, operates between the guide lugs 51 and 52 (shown in Figure 4). The inner end of the plate 50 is formed with an upstanding shoulder lug 53 and the forward inner end is provided with an upstanding lug 54. A coil spring 55 having one end secured to the base 39 and the other end connected at 56 to the lug 54 operates to normally move the plate 50 into backward position as illustrated in Figure 1.

The upstanding lug 54 is adapted to carry a rubber vacuum cup 57 which is positioned in a manner to engage the cup-like member 58 when the cover C is opened and the edge 34 of the cover strikes the lug 53 which moves the plate 50 forward so that the vacuum cup 57 will come in contact with the member 58. The member 58 is supported by the base member 59 to the bottom 39 of the index A. The member 58 is formed with a cup-like portion 60 and with an inner surface 61. The surface 61 forms a cup-like contact for engaging the edge 62 of the vacuum cup 57 (as illustrated in Figure 2) when the cover is opened. The force of opening the cover C causes the edge 34 to engage the upstanding lug 53 thereby flattening the vacuum cup 57 against the surface 61.

Figures 1, 2:
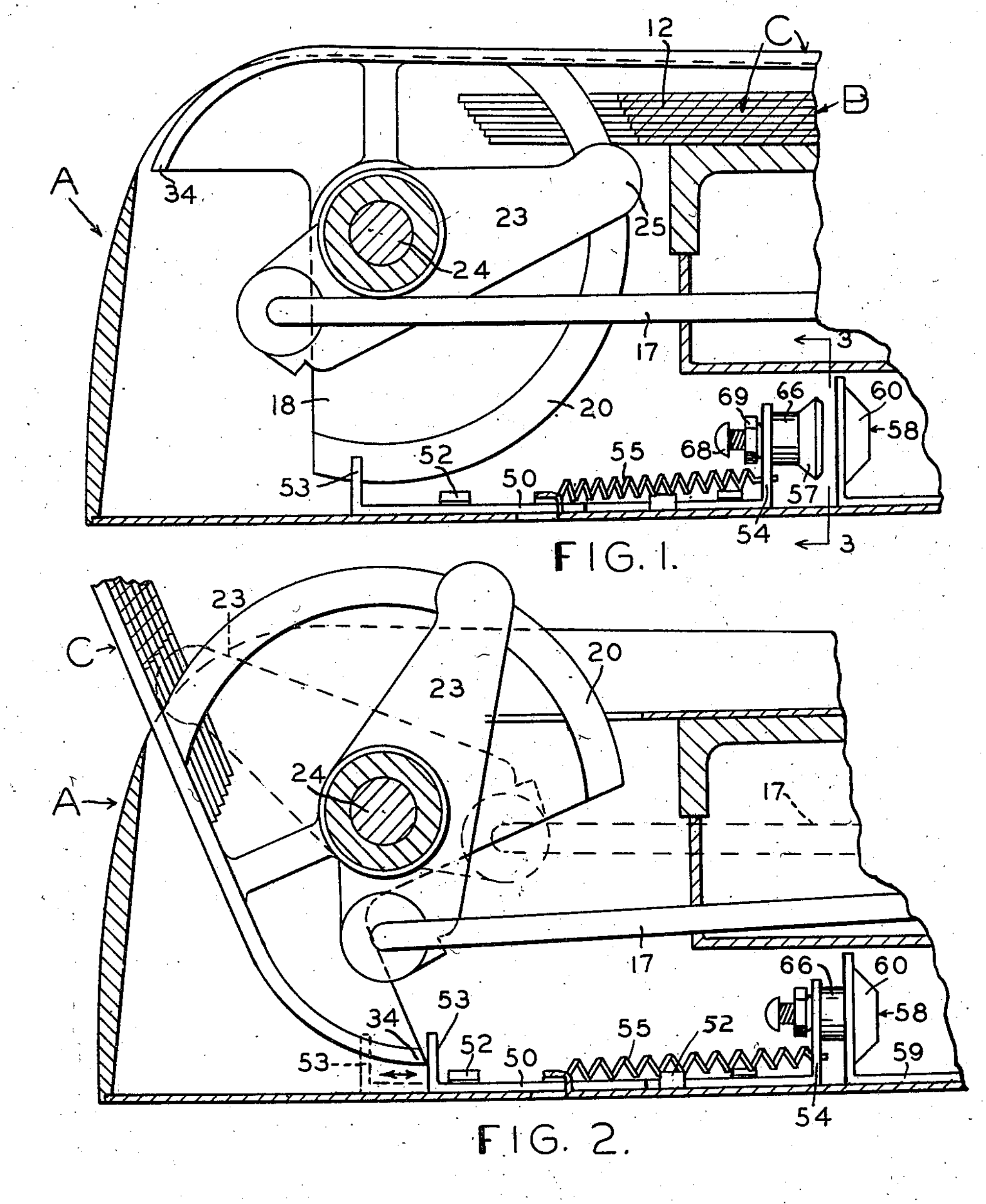
Figure 1 is an enlarged sectional detail of a portion of the index illustrated in the above-entitled patent and showing the cover of the index in closed position with the automatic closing means in the position that it assumes when the cover is closed.
Figure 2 is a similar section to Figure 1 showing the cover of the index open and the position of the parts of the automatic closing means.
Figure 3:
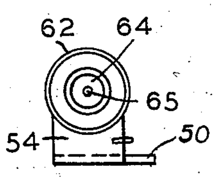
Figure 3 is a view on the line 3—3 of Figure 1 indicating the end of the air suction cup of the closing means.

The vacuum cup 57 holds the plate 50 in this forward position (as illustrated in Figure 2) until the air has leaked into the vacuum cup 57 sufficiently to release the same from the surface 61, whereupon the spring 55 causes the plate 50 to move backward and the lug 53 to strike the edge 34 of the cover C with triggerlike action thereby impacting a kicking force to the cover C and causing the same to be closed, whereupon the parts will assume their respective positions as shown in Figure 1.

The vacuum cup 57 acting against the surface 61 permits the cover C to remain open for a short period of time, and when the vacuum cup 57 is released from the surface 61 the spring 55 automaticaly closes the cover C. The holding time for the vacuum cup 57 is governed by the time it takes for the air to leak into the cup 57 causing the same to let go of the surface 61 and automatically closing the cover C.

Figure 5:
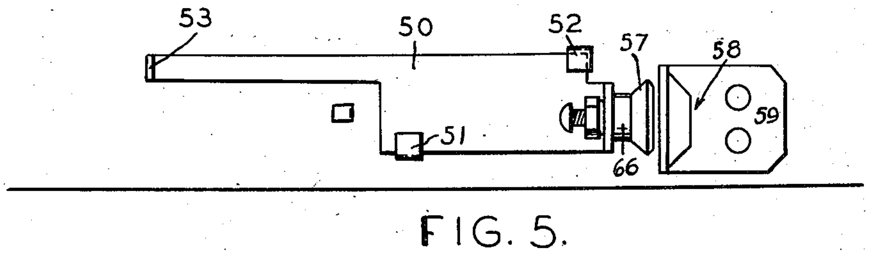
Figure 5 is an enlarged plan view of that portion of the timer showing the vacuum cup bleeder screw and lock nut for the same.
Figure 6:
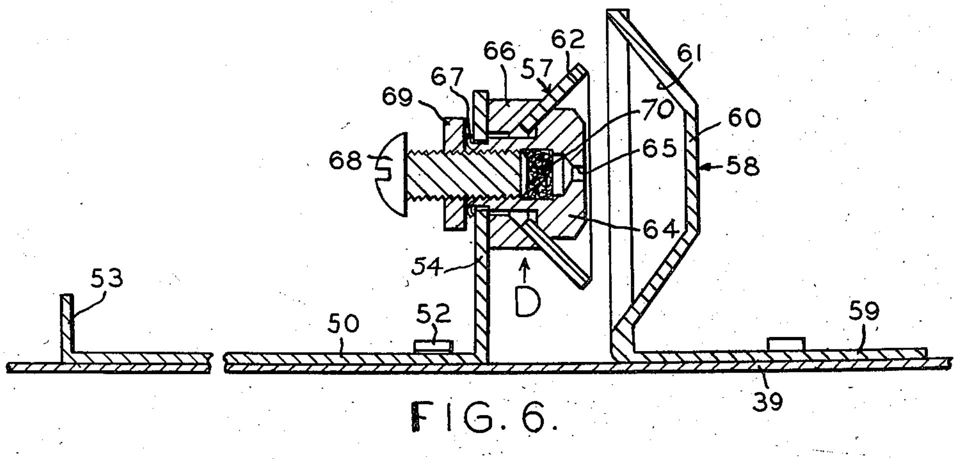
Figure 6 is an enlarged sectional view on the line 6—6 of Figure 5.

In Figures 5 and 6 I have illustrated enlarged details of the timer unit D. Figure 6 is a section to indicate the relation of the parts. In Figures 5 and 6 the vacuum cup 57 is shown in open position out of contact with the inner surface 61 of the cup-like member 58.

The timer unit means D includes the cup-like member 58 which is fixed to the bottom 39 as heretofore set forth and includes the vacuum cup 57. The vacuum cup 57 is riveted to the upstanding lug 54 by the rivet member 64. An air hole 65 is formed in the rivet 64. The rivet 64 clamps the inner surface of the vacuum cup 57 against the cup bushing 66. The bushing 66 bears against the lug 54. The inner edge 67 of the rivet 64 is upset against the lug 54 thus the vacuum cup 57 is held firmly and rigidly to the upstanding lug 54.

The rivet 64 is internally threaded to receive the bleeder screw 68 which is adapted to be set in a locked position by the locking nut 69. The inner end of the bleeder screw 68 is adapted to bear against the bleeder plug 70 which may be made of felt or any other suitable porous material.

In setting the timer unit D the operator screws the bleeder screw 68 against the plug 70 to compress the same to the desired degree so that air will leak over the threads of the screw 68 and through the bleeder plug 70 coming through the hole 65 from within the vacuum cup 57. This will release the vacuum cup 57 from the surface 61. When the screw 68 is properly set the locking nut 69 is turned into locking position thereby setting the timing unit D to provide the proper time for the cover C to remain open after each opening operation.

The operation of the loose leaf memorandum index A is unique in permitting the operator to engage a selected key on the keyboard of the index and by manual force pull the cover C into open position. This having been accomplished, the operator may forget the matter of closing the cover C owing to the function of the automatic closing means which is forced into normal closed position by the action of the spring 55. The interval of time that passes while the vacuum cup 57 is holding the plate 50 in a forward position is just long enough for the user of the index A to refer to the indicia which may be written upon the cards 12. Thus, it is not necessary for the operator to close the cover C by hand after he has opened the same to a selected page.

The means for automatically holding and closing the cover C as herein set forth is of a simple nature. The parts forming the automatic holding and closing means are located upon the bottom plate 39 of the index A in the left hand rear corner of the index (not shown in the drawings), and thus, these parts do not interfere with the other operating parts of the index A. The simplicity of the parts for automatically closing the cover C provides an economical means for closing the same which may be readily added to the index illustrated in Patent No. 2,536,544. The automatic holding and closing means herein set forth is very desirable for the user of the index and adds to the ease and convenience of operating the same.

I claim:

1. In a selectable loose leaf index, a series of loose leaf sheets positioned in said casing, a cover hingedly mounted on said casing, a series of fingers pivotally mounted on a common shaft adapted to raise said cover and selected sheets, a series of finger keys slidably mounted on said casing, rod members connecting said fingers with said keys, and timed means positioned adjacent said cover and responsive to the movement of said cover for closing said cover after the same has remained open for a predetermined period of time.

2. An alphabetical index including a pack of loose leaf index cards having the alphabet indicia thereon, means for pivotally supporting said cards to rotate on an arc, a casing for enclosing said cards, a cover for said casing, arcuated track means on said cover for supporting said cards, means for selectively raising said cards and cover including lifting fingers adapted to select and operate said cards into an elevated position, and closure means set by said raising means for automatically closing said cover after a predetermined opened period.

3. A selectable memorandum including a series of loose leaf sheets for receving indicia, a casing means for holding said sheets in a normally horizontal position, a cover for said casing, arcuated tracks for holding said sheets formed on the inner side of said cover adjacent its pivot point, means for pivotally supporting said cover to permit the free edge thereof to be elevated into backwardly inclined displaying position, means for selectively lifting said sheets, said cover forming a back support to hold the selected sheets in display position lying against the inner surface of said cover, and timed means including a slidable spring-urged plate and air bleeder means responsive to the movement of said cover to set said timed means for automatically closing said cover and moving said sheets to their normal horizontal position.

4. An alphabetical index having a casing adapted to support a series of cards normally lying horizontally in a compact state, each card having alphabetical indicia thereon, finger operated keys carried by said casing adapted to raise said selected cards and simultaneously open said index to move the cards selected into viewing position, timed automatic closing means including a slidable bar actuated by the opening of said index on which a vacuum cup is mounted, a surface against which said vacuum cup is adapted to engage when said casing is opened by the operation of one of said keys, a bleeder air passageway leading from said vacuum cup, and means for adjusting the amount of air passing through said bleeder passageway to time the period said index is opened before said automatic means closes the same.

5. In a selectable loose leaf index, a casing for enclosing said index, a series of loose leaf sheets positioned in said casing, a cover hingedly mounted on said casing and adapted to move into a backwardly inclined position when opened, a series of fingers pivotally mounted on a common shaft adapted to raise said cover and simultaneously select one of loose leaf sheets from said index and move the same with said cover into a backwardly inclined viewing position, timed means for automatically closing said cover to return said selected sheet to its normal horizontal position, said timed means including a vacuum cup mounted on a movable member actuated by a portion of said cover, a surface against which said cup is adapted to be compressibly engaged, a bleeder air passageway adapted to draw air from said inner surface of said vacuum cup, a compressible material in said bleeder passageway and an adjustable screw for compressing said compressible material to regulate the time necessary to bleed air from within said vacuum cup to cause the same to disengage from said surface against which it was compressed, spring means connected to said movable member for automatically drawing the same against said cover of said casing to close the same and return said selected sheet to normal position when said vacuum cup is released.

6. In a selectable card index device having a timing mechanism for the card lifting mechanism, a closure member mounted on the device and spring-urged for resistance against the opening movement of a portion of the card-lifting mechanism, a vacuum cup responsive to the movement of said closure member, stationary means engageable by said vacuum cup as said closure member is moved by the card-lifting mechanism permitting the card-lifting mechanism to remain in a lifted position for a predetermined period of time.

7. A selectable card index device having a timing device for the card-lifting mechanism comprising a member slidably mounted on the index device, said slidable member being spring-urged for resistance against the opening movement of a portion of the card-lifting mechanism, a stationary member mounted on the index device adjacent said slidable member, a vacuum cup carried by said slidable member and engageable with said stationary member for connection therewith when said slidable member is moved by a portion of the card-lifting mechanism against the action of said spring, and means for regulating the time of connection of said vacuum cup with said stationary member.

8. In a selective card index device having a series of rod and key actuated fingers for raising a pivoted cover member with a selected card thereon mounted on a casing, the improvement for automatically returning the cover and card to a closed position on the casing, said improvement comprising a bar slidably mounted in the casing and actuated by a portion of the cover when the cover is pivotally raised, a vacuum cup carried by said bar, stationary means engageable by said vacuum cup, spring means adapted to draw said bar against said portion of the cover when in a raised position to pivotally return the cover to a closed position upon the failure of engagement of said vacuum cup with said stationary means.

References Cited in the file of this patent

UNITED STATES PATENTS

| | | |
|---|---|---|
| 1,243,380 | Berger | Oct. 16, 1917 |
| 1,543,599 | Chester | June 23, 1925 |
| 1,649,448 | Cutler | Nov. 15, 1927 |
| 2,298,882 | Grunwald | Oct. 31, 1942 |
| 2,334,751 | Chapman | Nov. 23, 1943 |
| 2,536,544 | Gordenier | Jan. 2, 1951 |
| 2,680,329 | Wigal | June 8, 1954 |